United States Patent
Shaffer et al.

(10) Patent No.: US 6,516,059 B1
(45) Date of Patent: Feb. 4, 2003

(54) METHOD AND SYSTEM FOR ADAPTIVELY ALLOCATING CALL-RELATED TASKS

(75) Inventors: Shmuel Shaffer, Palo Alto, CA (US); William Joseph Beyda, Cupertino, CA (US); Dieter Rencken, San Jose, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/456,931

(22) Filed: Dec. 7, 1999

(51) Int. Cl.$^7$ .................................................. H04M 3/42
(52) U.S. Cl. ............................ 379/211.02; 379/212.01; 379/133
(58) Field of Search ....................... 379/211.02, 212.01, 379/111, 133, 140

(56) References Cited

U.S. PATENT DOCUMENTS

| | | | |
|---|---|---|---|
| 5,526,404 A | * | 6/1996 | Wiedeman .................. 455/430 |
| 5,812,533 A | * | 9/1998 | Cox ........................... 370/259 |
| 6,058,307 A | * | 5/2000 | Garner ....................... 455/428 |
| 6,118,862 A | * | 9/2000 | Dorfman et al. ........ 379/201.03 |
| 6,292,481 B1 | * | 9/2001 | Voit et al. .................... 370/352 |
| 6,363,145 B1 | * | 3/2002 | Shaffer et al. .......... 379/265.02 |
| 6,396,849 B1 | * | 5/2002 | Sarkissian et al. ........... 370/490 |

* cited by examiner

*Primary Examiner*—Creighton Smith

(57) ABSTRACT

A method of allocating resources for implementing certain call-related features, such as call forwarding, includes enabling a centrally accessed unit (e.g., a gatekeeper) to support the features and enabling telephony devices (e.g., personal computers running ToL client software) to independently implement the features. Thus, there is redundant capability with respect to the features. A task-allocation scheme is established for adaptively assigning execution of the tasks needed to perform the features. The scheme is at least partially based upon determining processing resource availability within either or both of the centrally accessed unit and the telephony devices. When a request for a feature is detected, the execution of the requested feature is assigned to either the centrally accessed unit or the particular telephony device with which the request is associated, depending upon the current processing resource availabilities. The method is preferably utilized in a ToL network, which may include a load-sharing server that is dedicated to the adaptive allocation of the call-related tasks.

18 Claims, 5 Drawing Sheets

METHOD AND SYSTEM FOR ADAPTIVELY ALLOCATING CALL-RELATED TASKS

TECHNICAL FIELD

The invention relates generally to methods and systems for allocating resources for performing call-related tasks and relates more particularly to allocating resources in a network environment in which there is redundant capability in implementing the call-related tasks.

BACKGROUND

There are a number of alternative architectures for supporting call capability for telephony devices of a local area network (LAN), such as telephones and/or telephony-enabled computers in a corporate environment. A private branch exchange (PBX) may be used to support calls to and from telephony devices that are on the premises of the owner of the PBX. Traditional PBXs provide all of the call processing for the supported telephony devices. This call processing includes supporting call-related features, such as call forwarding and voice messaging, in addition to the required routing of incoming and outgoing calls.

As an alternative to the centralized architecture, distributed call processing allows at least some of the call-related features to be implemented at the telephony devices, but typically also includes a device (a "centrally accessed unit") that is utilized by all of the telephony devices. For example, personal computers running telephony over local area network (ToL) clients can handle call-related features such as call forwarding, while a gatekeeper is used to enable features and to perform limited management functions, such as translating addresses, or feature services. PBXs may also be adapted to provide distributed call processing capability.

Thus, an advantage of distributed call processing is that the call-related tasks can be performed at the telephony devices. This frees the centrally accessed unit (e.g., a gatekeeper) of the system to perform the processing which can only be implemented at the centrally accessed unit. The gatekeeper or comparable unit may be considered to be a universal central processing unit (CPU), while the telephony devices may be considered to be edge CPUs. By dedicating the universal CPU to tasks that must be performed by the universal CPU, the delays that are imposed by operations within the universal CPU can be controlled.

Common programming languages that are used at the centrally accessed unit in a distributed call processing environment include C and C++. The programming language may be different at the telephony devices. Computers running ToL clients often use the JAVA® programming language (JAVA is a registered trademark of Sun Microsystems). With regard to the call-related features, the JAVA language is often less efficient than C or C++. Consequently, simple call processing tasks performed at a personal computer of a user may consume a significant percentage of the processing resources of the computer. Moreover, delays will be introduced as a result of the processing demands associated with performing a call-related task (e.g., call forwarding). The delays will be greater for computers without a high level of power. One solution is to equip each telephony device with a CPU that may be unnecessarily powerful for other software applications, but which is necessary to efficiently handle all of the call-related task processing that is to be performed by the telephony devices. The concern with this solution is that it imposes a significant expense upon a corporation or other entity that maintains a number of such telephony devices.

A partial solution is to assign implementation of specific call-related features to the centrally accessed unit, even though the features could be implemented at the device level. As one example, voicemail capability may be implemented using a server connected to a gatekeeper, rather than providing ToL client voicemail capability. The benefits of this partial solution will be greater under certain operating conditions than under others. In fact, the effects may be negative under conditions that may be related to current levels of call traffic and/or current demand for a particular call-related feature that is implemented at the centrally accessed level when it could be implemented at the device level.

What is needed is a method and system for providing distributed call processing capability without unnecessarily sacrificing system performance under certain operating conditions.

SUMMARY OF THE INVENTION

A method and a system utilize adaptive distributed call processing to achieve high system performance over a wide range of operating conditions. The system includes a centrally accessed unit that at least partially supports call capability for a number of telephony devices. The method includes enabling the centrally accessed unit to implement specific call-related features and enabling the telephony devices to implement the same features, so that there is a redundant capability. A task-allocation scheme is established to allow requests for the features to be responded to on the basis of current resource capability. For each request for implementation of a specific call-related feature for which there is redundant capability, there is an adaptive assignment that is at least partially based upon current availability of processing resources within at least one of the centrally accessed unit and the particular telephony device that is associated with the request.

In the preferred embodiment, the telephony devices are personal computers running ToL client software. The centrally accessed unit may be a gatekeeper or another device having corresponding capabilities. Also in the preferred embodiment, the determination of the current availability of processing resources involves anticipating the delays associated with executing the requested call-related feature at the centrally processing unit. If the anticipated delay is below a predetermined delay threshold, the implementation of the requested feature is assigned to the centrally accessed unit. On the other hand, if the anticipated delay is greater than the predetermined delay threshold, the telephony device associated with the call is assigned the task of implementing the requested feature. The predetermined delay threshold may be based upon the anticipated delay at the telephony device if the telephony device is assigned to implementing the requested feature. In an alternative embodiment, rather than selecting a fixed delay threshold, the assignment is based upon determining and comparing current availabilities of processing resources at the centrally accessed unit and the telephony device.

The anticipated delays at the centrally accessed unit will depend upon the available processing power. In accordance with the task-allocation scheme, the centrally accessed unit may be assigned to performing each call-related task for which redundant capability is available, until a predetermined threshold of processing power is being accessed as a result of previous requests. Once the predetermined threshold has been reached, the subsequent requests for the call-related features are assigned to the telephony devices.

Assignment to the centrally accessed unit does not return until changes in traffic or other circumstances allow the available processing power to return to a level below the predetermined threshold.

In another embodiment, the telephony devices are telephones and the centrally accessed unit is a PBX or similar switching capability. In this embodiment, the telephones must be configured to enable implementation of the specific call-related features independently of the PBX. For example, the telephones may be feature phones that are configured to enable call forwarding.

In another embodiment, the centrally accessed unit is a server dedicated to a particular call-related feature, and the telephony devices are telephones. Again, the telephones must be able to provide the necessary digital signal processing to implement modern call-related features. In one application of this embodiment, the server is dedicated to providing voicemail capability, but the individual telephones provide redundant capability for voicemail manipulation (e.g., volume control). The requests for the voicemail capability are assigned to the server until a threshold level has been reached that indicates that the anticipated delays associated with leaving or manipulating voicemail messages at the server exceed anticipated delays associated with leaving or manipulating voicemail messages at the individual telephony devices.

The dynamic and adaptive shifting of the load between the centrally accessed unit (central CPU) and the telephony devices (edge CPUS) allows a system to take full advantage of the capabilities of the centrally accessed unit under low load and normal load operating conditions, but does not introduce undue delays during high load conditions. Load balancing may be configured to optimize the execution location of "moveable" features between the centrally accessed unit and the telephony devices.

DETAILED DESCRIPTION

Figure 1:
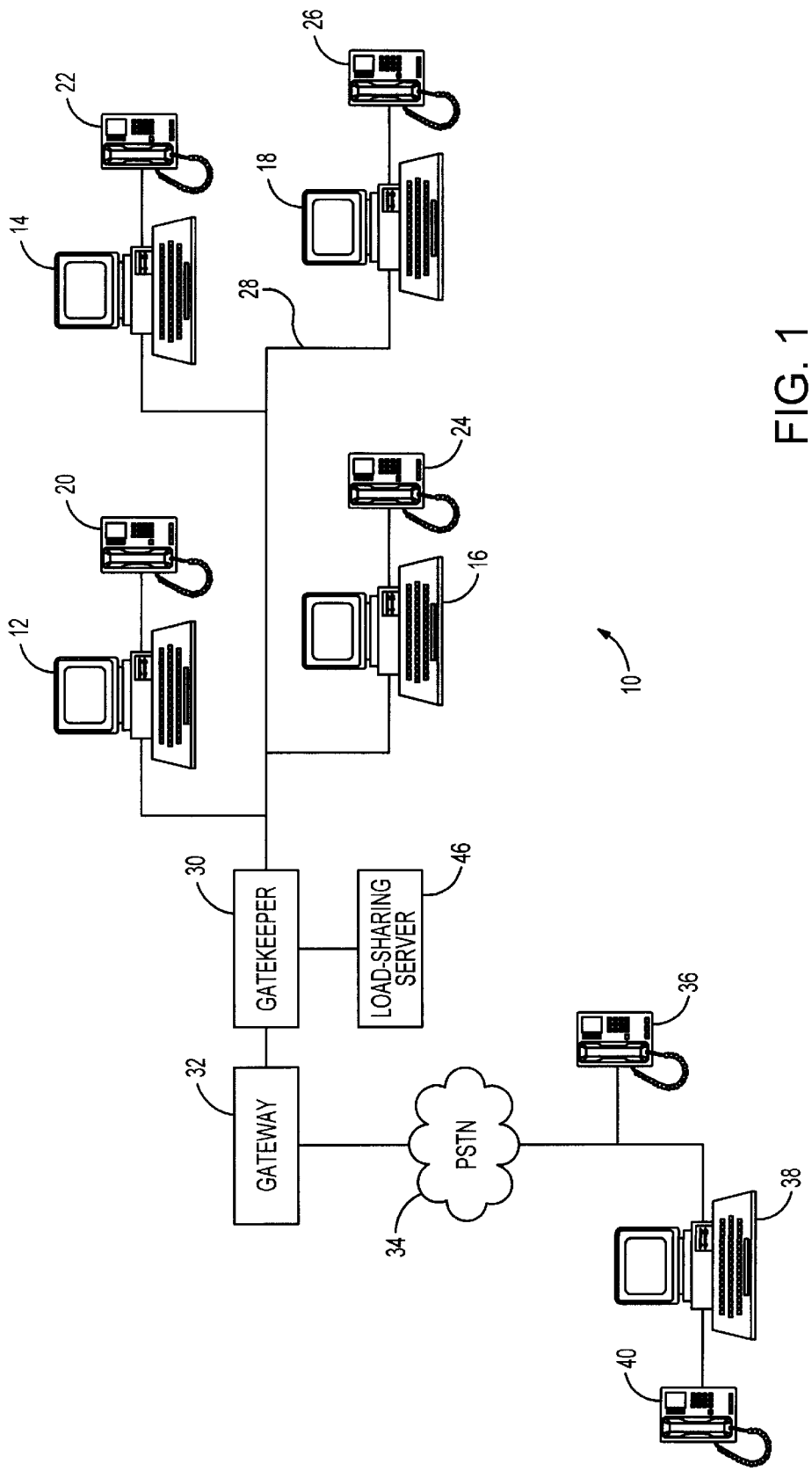
FIG. 1 is a schematic view of a telephonic system which incorporates adaptive distributed call processing in accordance with one embodiment of the invention.

With reference to FIG. 1, a network 10 of workstations is shown as being adapted for load sharing between a centrally accessed unit and a number of telephony devices. In the illustrated preferred embodiment, the network is a ToL system that includes a number of interconnected personal computers 12, 14, 16 and 18. Each personal computer is configured to run ToL software. Thus, the personal computers are preferably equipped with a telephony application programming interface (TAPI) that allows the computer to have telephone capability. While not critical, each computer may be connected to a digital telephone 20, 22, 24 and 26.

The computers 12–18 and telephones 20–26 transfer non time-critical data (such as electronic mail) and time-critical data (such as voice information) to each other over a network link 28. The network link may be wired or wireless. The computers and telephones are network endpoints that have unique addresses. For example, each of the computers may have a unique Internet Protocol (IP) address. The addresses are used to identify target endpoints for data and voice transfers.

The network 10 also includes a gatekeeper 30 and a gateway 32 (although shown connected to each other, this is not necessary as long as the gatekeeper and gateway are logically connected to network link 28). The gatekeeper 30 maintains a database of the unique addresses for the endpoints of the network. Upon receiving a request for a data or voice transfer from an external telephony device to one of the network endpoints, such as the telephony-enabled personal computer 12, the gatekeeper translates any endpoint alias (such as a hostname or e-mail address) or translates a telephone address (such as addresses in a telephone number format) to the appropriate network. As is well known in the art, gatekeepers also serve other functions.

The functions of the gateway 32 are also well known in the art. Gateways are used to provide protocol conversions, when necessary. The gateway may translate call control signals and call content from a packet-switched format used within the network 10 to a circuit-switched format used by the PSTN 34. The protocol conversion enables endpoints of the network 10 to communicate with external telephony devices, such as a telephone 36 or the workstation that consists of a telephony-enabled computer 38 and a telephone 40. If the network 10 is only connected to another data network, such as when networks are interconnected to form a wide area network (WAN), the gateway 32 may not be necessary, since protocol conversion may not be required.

In a specific embodiment, the gatekeeper 30 is a "centrally accessed unit" with respect to providing services for the network endpoints that include the computers 12–18 and the telephones 20–26. In other embodiments, the centrally accessed unit may be another centralized processing unit besides the gatekeeper. This centrally accessed unit is configured to provide a number of call-related features, such as call forwarding, voice messaging and intercom broadcasting. The computers 12–18 are also configured to implement these features. Thus, there is a redundant capability. Under certain operating conditions of the network 10, it may be preferable to utilize the capability of the gatekeeper 30 to perform the tasks necessary to implement a requested call-related feature. However, under other operating conditions, there may be an advantage to assigning the tasks to the computer to which a call is directed. For example, if a user of the computer 12 is temporarily located at the facility of the computer 14, the most efficient implementation of the call forwarding feature would depend upon the current operating conditions of the network.

Figure 2:
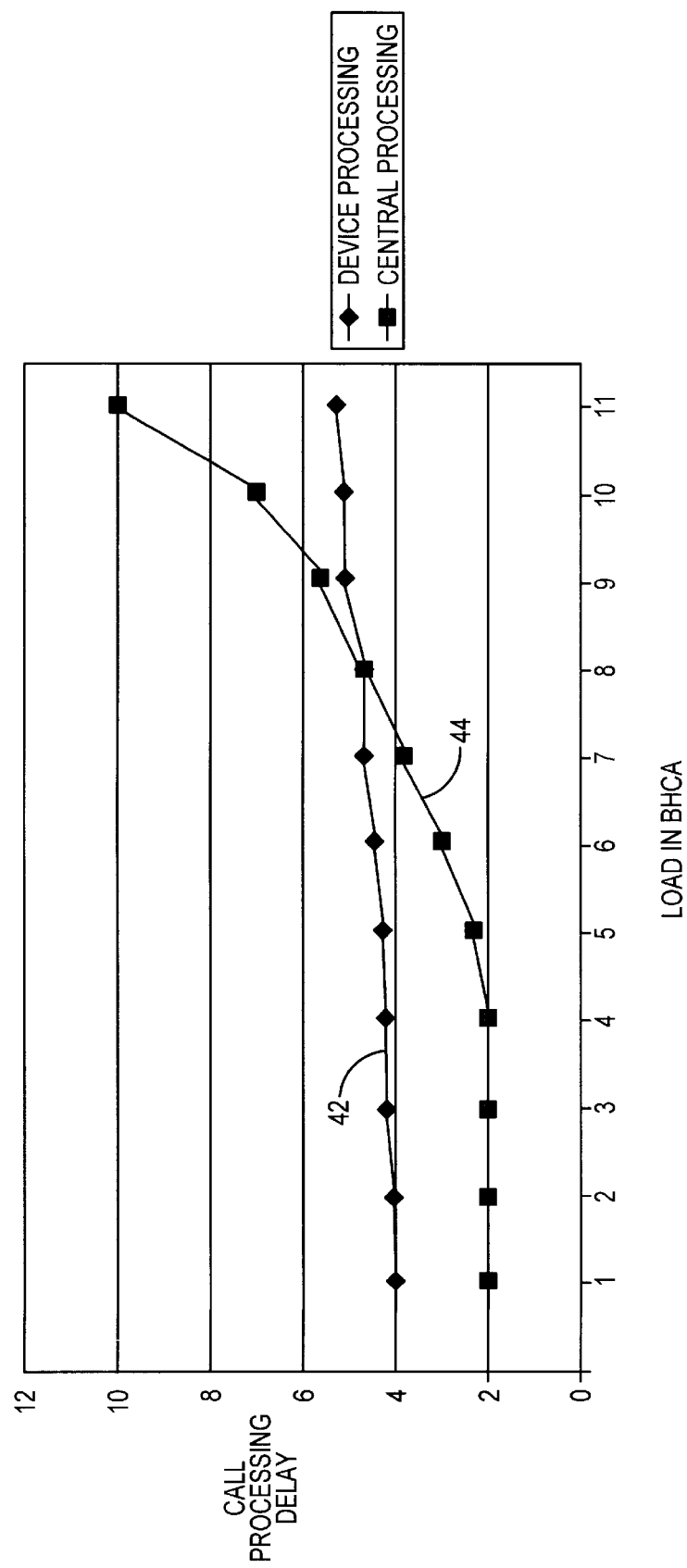
FIG. 2 is graph of call processing delays as a function of call-handling load.

Referring now to FIG. 2, the call processing delays associated with implementation at the device level and the central unit level are plotted as a function of busy hour call attempts (BHCA). The plot 42 of call processing delays for feature implementation at the device level is relatively level. On the other hand, under heavy load, the slope of the plot 44 of call processing delays for central processing increases significantly. For a network that exhibits the characteristics shown in FIG. 2 (in which the example shows a crosspoint at eight calls), an optimal task-allocation scheme would be one in which the central processing unit would be assigned to implementing the call-related features, until a request is received while the central processing unit is handling at least eight calls. It is then more efficient to assign the task to the telephony devices.

There may be a number of reasons for the network 10 to exhibit characteristics of the type shown in FIG. 2. Often, the gatekeeper 30 or a comparable device utilizes C or C++ language, while the telephony-enabled computers 12–18 utilize the JAVA computer language. Since the JAVA language is less efficient than C or C++, it is more efficient to perform the call-related tasks at the gatekeeper, if the entire system is idle. However, as the processing power at the gatekeeper is increasingly utilized, the CPU processing at the gatekeeper becomes a bottleneck. This increases the call processing delay, as indicated in FIG. 2. Under this condition, performing the tasks for implementing call forwarding or intercom broadcasting may encounter fewer delays if the tasks are assigned to the telephony devices that are operating under the less efficient programming language.

The adaptive task-allocation scheme may be enforced within the gatekeeper 30. As an alternative, the network 10 may include a load-sharing server 46 or other adjunct device that is used to enforce the load sharing. In a simple application, the server 46 merely monitors the activity at the gatekeeper 30. If the relationship of delays is consistent with FIG. 2, the monitoring of activity at the gatekeeper will be sufficient for determining optimal performance.

As an alternative to merely monitoring activity at the gatekeeper 30, the load-sharing server 46 or similar device may monitor activity at the individual telephony-enabled computers 12–18. Thus, the tasks for implementing a particular call-related feature for which there is redundant capability may be assigned to the target computer, unless the target computer is presently using a level of processing resources that is above a threshold level. As a third alternative, the load-sharing server 46 may monitor activity at both the gatekeeper 30 and the individual computers 12–18.

The parameter monitored by the load-sharing server 46 may be presently handled calls. In this application, the assignment of tasks may be shifted when the call load exceeds a predetermined load level. Referring again to FIG. 2, the predetermined load level may be eight calls during "busy hours." The call level may be varied depending upon the time of the day. In an alternative application, the load-sharing server 46 may monitor the available CPU power of the gatekeeper, or the individual computers 12–18, or all of the computers and the gatekeeper. Depending upon the available CPU power, the server is configured to assign the call-related tasks to the gatekeeper or the target computer. Other embodiments may be substituted, since the fundamental goal is to minimize imposed delays for executing the call-related tasks and/or minimizing imposed delays for tasks that must be performed simultaneously with the implementation of the features for which there is redundant capability.

Figure 3:
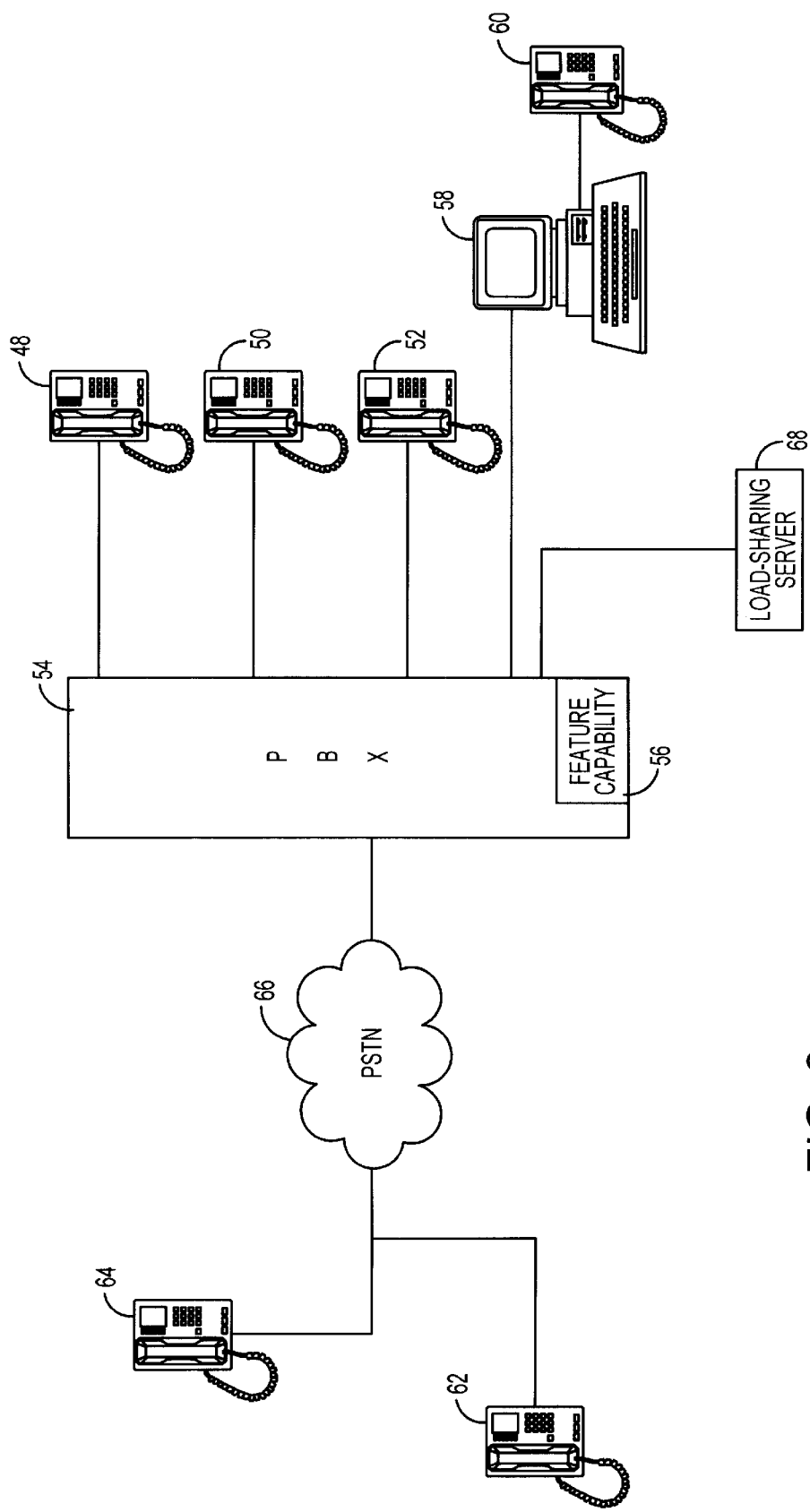
FIG. 3 is a schematic view of a second embodiment of a system having adaptive distributed call processing.

Referring now to FIG. 3, rather than a ToL network system, the invention may be used in a telecommunications system having stand-alone telephones 48, 50 and 52 that are supported by a PBX 54. The PBX is configured to enable implementation of the call-related features, as represented by the feature capability 56. Moreover, the telephones 48–52 are configured to provide redundant capability. Again, cell forwarding is one example of a call-related feature that can be implemented either at the centrally accessed unit (in this embodiment the PBX 54) or at the target telephony device (in this embodiment one of the telephones 48–52). Other features can be implemented at only one of the components. For example, message waiting notification must be implemented at the telephones. The invention cannot be used with such features.

While not critical, the PBX 54 may also support one or more telephony-enabled personal computers 58. The computer 58 is shown as being connected to a telephone 60, but again this is not critical. The PBX is a conventional device that routes calls directly between the telephones 48, 50, 52 and 60 or routes incoming and outgoing calls from the supported telephones to external telephony devices, such as the telephones 62 and 64 that are connected to the PSTN 66.

The system includes a load-sharing server 68 that functions in the same manner as the server 46 that was described with reference to FIG. 1. That is, the server 68 allocates tasks to either the feature capability 56 of the PBX 54 or to the redundant feature capability at the target telephone 48, 50, 52 or 60. The task-allocation scheme that is enforced at the load-sharing server 68 may be based upon current operating conditions at the PBX or upon current activity at the target telephone, or upon a combination of current activities. The system attempts to minimize delays. As noted above, the current available processing power of the PBX may be used as a factor in anticipating the delays that will be encountered if the call-related feature (e.g., call forwarding) is implemented at the PBX.

Figure 4:
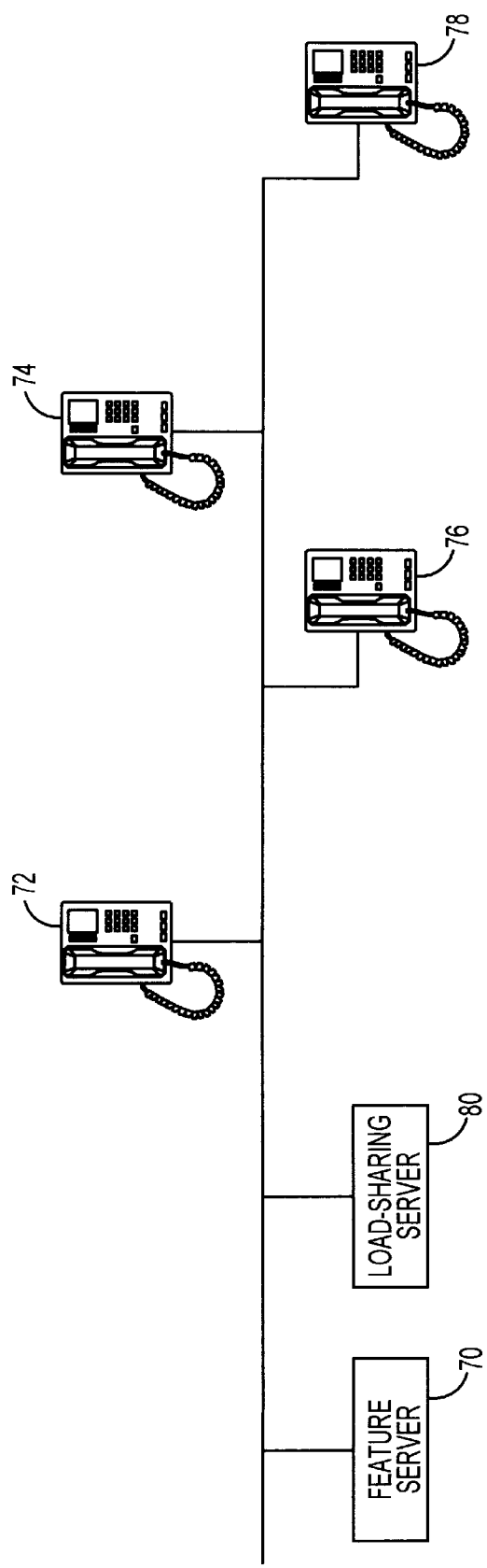
FIG. 4 is a third embodiment of a system having adaptive distributed call processing in accordance with the invention.

A third embodiment of the invention is illustrated in FIG. 4. In this embodiment, the "centrally accessed unit" is a server 70 (e.g., a voicemail server) that is dedicated to supporting one or more call-related features for telephones 72, 74, 76 and 78. The telephones may be conventional devices which are programmed to provide redundant capability for implementing at least one of the call-related features (e.g., volume control during voicemail playback). A load-sharing server 80 enforces a task-allocation scheme of the type described above. Consequently, the selection of a particular processing capability for implementation of a requested call-related feature is based upon controlling the processing load, so that delays are manageable.

Figure 5:
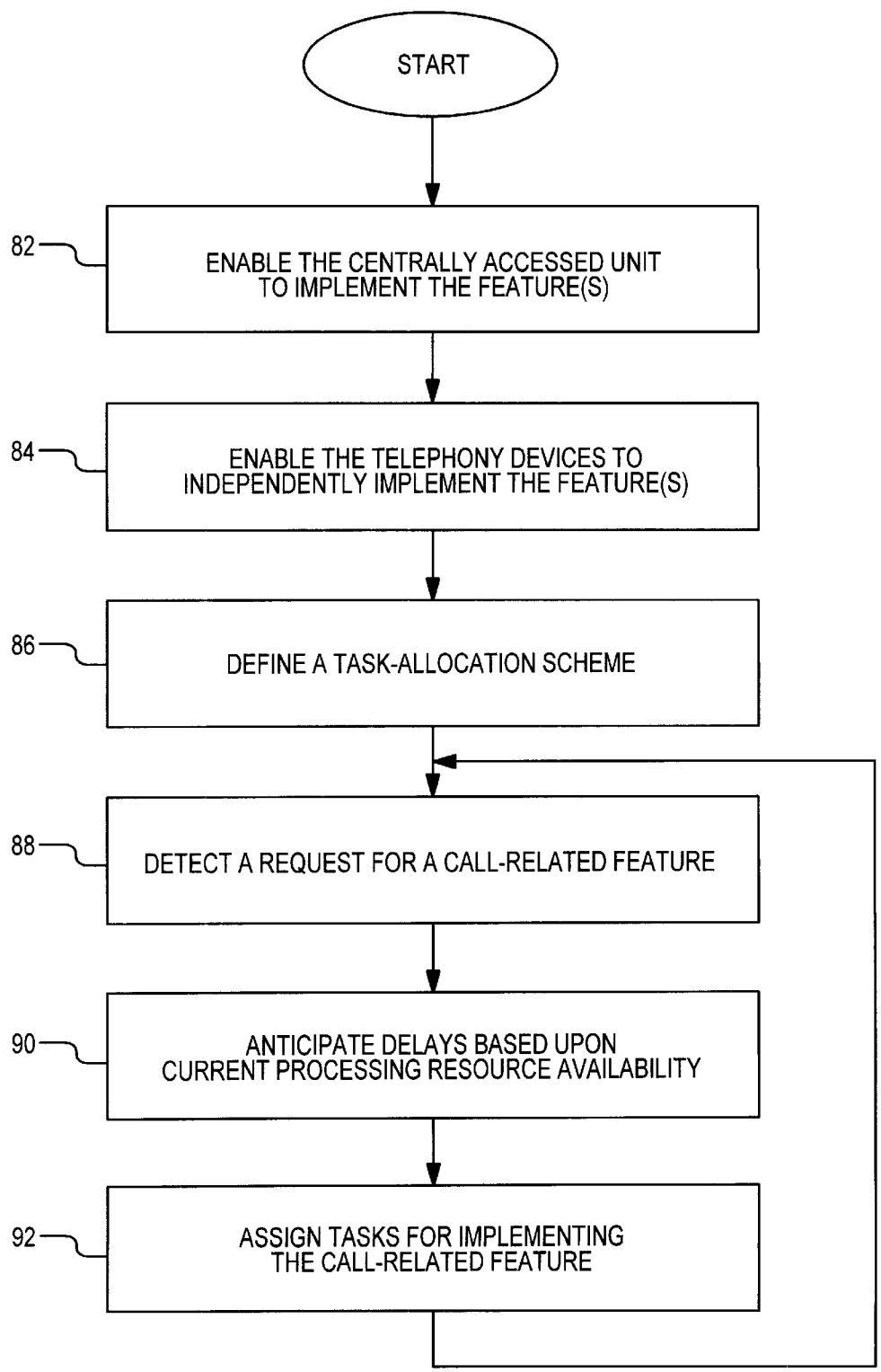
FIG. 5 is a process flow of steps for executing the adaptive distributed call processing.

The steps for executing the adaptive distributed call processing method will be described with reference to FIG. 5. In step 82, the centrally accessed unit is configured to implement the call-related feature or features for which there will be redundant capability. The centrally accessed unit may be a gatekeeper, a PBX, or a comparable device. Alternatively, the centrally accessed unit may be a server that is dedicated to supporting the call-related features, as described with reference to FIG. 4. However, in the preferred embodiment, the invention is used in a ToL network environment.

The telephony devices are configured to independently implement the call-related feature or features, as represented in step 84. The telephony devices are preferably personal computers running ToL client software, but other embodiments are contemplated. For example, the telephony devices may be conventional telephones that contain sufficient digital signal processing circuitry and programming to allow the features to be locally implemented. It is common for a ToL client to be programmed in the JAVA programming language or in some other language that is less efficient than the programming language used at the centrally accessed unit. Therefore, the features are typically more efficiently executed at the centrally accessed unit if the unit has sufficient currently available processing resource capability to operate at or near its full capacity. The concern is that there are times at which the current operating conditions of the centrally accessed unit render it more efficient to implement the call-related features at the device level.

At step 86, the task-allocation scheme is defined. The scheme will depend upon the particular network in which the redundant feature capability resides. The system is then ready for operation in accordance with the invention.

When a request for a call-related feature is detected at step 88, the task-allocation scheme is accessed. In step 90, the delays associated with the implementation of the requested feature are anticipated. This may merely be a measure of the current utilization of the processing resources of the centrally accessed unit (e.g., the gatekeeper). The CPU power that is currently used may be monitored. However, other means for determining and anticipating delays are contemplated. The process may include monitoring the available processing power at the telephony devices.

Based upon the determinations from step 90, the tasks for implementing the requested feature are assigned at step 92. Ideally, the process of FIG. 5 optimizes the balance between processing at the central level and processing at the device level (i.e., the edge level). The method compares the process delays at the central level to the process delays at the device level. While certain features, such as message waiting notification, can only be carried out at the device level, other features, such as call forwarding, can be performed either centrally or at the endpoints. The load-sharing server seeks to optimize the execution location of the features for which there is redundant capability. The process then returns to step 88 to detect the next request for a call-realted feature that may occur.

What is claimed is:

1. A method of allocating resources for performing call-related tasks comprising the steps of:

enabling a centrally accessed unit to implement specific call-related features;

enabling a plurality of telephony devices to implement said specific call-related features, said telephony devices being supported by said centrally accessed unit, thereby providing redundant capability with respect to implementing said specific call-related features;

establishing a task-allocation scheme for adaptively assigning executions of said call-related features to said centrally accessed unit and said telephony devices on a call-by-call basis, including at least partially basing said task-allocation scheme upon processing resource availability within at least one of said centrally accessed unit and said telephony devices;

detecting requests for said specific call-related features; and for each said request and in accordance with said task-allocation scheme, assigning execution of a requested specific call-related feature to either said centrally accessed unit or a particular one of said telephony devices with which said request is associated, including determining current processing resource availability for said at least one of said centrally accessed unit and said particular telephony device.

2. The method of claim 1 wherein said step of enabling said telephony devices includes providing client software in computers connected in a telephony over local area network (ToL) environment.

3. The method of claim 1 wherein said step of assigning execution of said requested specific call-related feature includes determining anticipated delays associated with executing said requested specific call-related feature at said centrally accessed unit and includes selecting said centrally accessed unit if said anticipated delays are below a predetermined delay threshold.

4. The method of claim 3 further comprising a step of selecting said predetermined delay threshold such that said anticipated delays are approximately equivalent to anticipated delays for executing said requested specific call-related feature at said particular telephony device with which said request is associated.

5. The method of claim 4 wherein said step of assigning execution includes selecting between said centrally accessed unit and said particular telephony device based upon determination of a lesser degree of anticipated delays.

6. The method of claim 1 wherein said step of assigning execution includes determining current processing resource availabilities at each of said centrally accessed unit and said particular telephony device and includes selecting said centrally accessed unit and said particular telephony device based upon said current processing availabilities.

7. The method of claim 1 wherein said steps of enabling said centrally accessed unit and said telephony devices include enabling a redundant call forwarding capability.

8. The method of claim 1 wherein said step of assigning execution includes continuously monitoring available central processing unit (CPU) power within said centrally accessed unit and includes selecting between said centrally accessed unit and said particular telephony device based upon currently available CPU power.

9. The method of claim 1 wherein said step of enabling said centrally accessed unit includes configuring a server and wherein said step of enabling said telephony devices includes configuring telephony-enabled computers.

10. A method of allocating resources for performing a call-related feature in an environment in which performance of said feature can be implemented either at a central call processing capability or at telephony devices to which calls are directed, said method comprising the steps of:

identifying a call for which said feature is relevant, including identifying said telephony device that is a party to said call;

comparing current anticipated delays for performing said feature via said central call processing capability to anticipated delays for performing said feature via said telephony device; and selecting between performing said feature via said central call processing capability and said telephony device based upon results of said comparing step.

11. The method of claim 10 wherein said comparing step includes monitoring said current anticipated delays based upon a threshold of available processing power, performance of said feature being assigned to said telephony device when said available processing power at said central call processing capability exceeds said threshold.

12. The method of claim 10 wherein said steps of identifying, comparing and selecting are executed in a ToL environment, said telephony devices being telephony-enabled computers.

13. The method of claim 12 wherein said feature is call forwarding.

14. A system for implementing specific call-related features comprising:

a centrally accessed unit having a capability to implement said specific features, said centrally accessed unit being configured to recognize requests for said specific features;

a plurality of telephony devices supported by said centrally accessed unit with respect to availability of said specific features, said telephony devices being configured to individually implement said specific features independently of said centrally accessed unit; and means for selecting between implementing said specific features at said centrally accessed unit or at a particular telephony device on a basis of current processing availability at said centrally accessed unit, said means for selecting being cooperative with said central processing unit to monitor said current processing availability.

15. The system of claim 14 wherein said centrally accessed unit and said telephony devices are connected in a ToL environment, said telephony devices being telephony-enabled computers.

16. The system of claim 15 wherein said specific features include call forwarding.

17. The system of claim 14 wherein said means for selecting is configured to select said centrally accessed unit when said current processing availability is above a predetermined threshold level that is selected to maintain excess processing capability at said centrally accessed unit.

18. The system of claim 14 wherein said centrally accessed unit is a server dedicated to enabling telephony features.

* * * * *